(12) United States Patent
Kim

(10) Patent No.: US 7,821,586 B2
(45) Date of Patent: Oct. 26, 2010

(54) LIQUID CRYSTAL DISPLAY PANEL AND METHOD OF FABRICATING THE SAME

(75) Inventor: Jin Wuk Kim, Uiwang-si (KR)

(73) Assignee: LG. Display Co., Ltd., Seoul (KR)

( * ) Notice: Subject to any disclaimer, the term of this patent is extended or adjusted under 35 U.S.C. 154(b) by 241 days.

(21) Appl. No.: 11/104,786

(22) Filed: Apr. 13, 2005

(65) Prior Publication Data
US 2005/0231669 A1    Oct. 20, 2005

(30) Foreign Application Priority Data
Apr. 14, 2004    (KR) .................. 10-2004-0025804

(51) Int. Cl.
*G02F 1/136* (2006.01)
(52) U.S. Cl. ........................ 349/43; 349/187
(58) Field of Classification Search .............. None
See application file for complete search history.

(56) References Cited

U.S. PATENT DOCUMENTS

| | | | | |
|---|---|---|---|---|
| 4,308,224 A | * | 12/1981 | Becker | 264/451 |
| 5,355,235 A | * | 10/1994 | Nishizawa et al. | 349/43 |
| 5,673,251 A | * | 9/1997 | Suzuki et al. | 369/275.4 |
| 5,995,190 A | * | 11/1999 | Nagae et al. | 349/156 |
| 6,322,936 B1 | | 11/2001 | Nishikawa et al. | |
| 6,597,525 B2 | * | 7/2003 | Kubota | 359/885 |
| 2003/0071794 A1 | * | 4/2003 | Arakawa et al. | 345/173 |
| 2003/0118922 A1 | * | 6/2003 | Hayashi et al. | 430/7 |
| 2005/0063059 A1 | * | 3/2005 | Yukawa | 359/558 |

FOREIGN PATENT DOCUMENTS

| | | |
|---|---|---|
| JP | 1-284802 | 11/1989 |
| JP | 03-063628 | 3/1991 |
| JP | 10-282333 | 10/1998 |
| JP | 11-202116 | 7/1999 |
| JP | 2000-019527 | 1/2000 |
| JP | 2000-310772 | 11/2000 |

OTHER PUBLICATIONS

Office Action dated Dec. 8, 2006 for corresponding Chinese Patent Application No. 200510063578.2.
Office Action issued in corresponding Japanese Patent Application No. 2005-117119; mailed Nov. 4, 2008.

* cited by examiner

*Primary Examiner*—David Nelms
*Assistant Examiner*—Lucy P Chien
(74) *Attorney, Agent, or Firm*—Brinks Hofer Gilson & Lione

(57) ABSTRACT

A method of forming a liquid crystal display panel is presented. A black matrix is formed on a substrate. A color filter is formed at an area which is divided by the black matrix. An overcoat layer and a spacer formed simultaneously by press-forming a liquid pre-polymer material with a soft mold on the color filter. The liquid pre-polymer material is heated for a predetermined time while the mold is applied. The liquid pre-polymer material contains a basic resin such as polyethylene glycol, a binder such as styrene-acrylic co-monomer and a photo-initiator.

15 Claims, 10 Drawing Sheets

LIQUID CRYSTAL DISPLAY PANEL AND METHOD OF FABRICATING THE SAME

This application claims the benefit of Korean Patent Application No. P2004-25804 filed in Korea on Apr. 14, 2004, which is hereby incorporated by reference.

FIELD OF THE INVENTION

The present invention relates to a liquid crystal display panel, and more particularly to a liquid crystal display panel that is adaptive for patterning an overcoat layer and a spacer of the liquid crystal display panel without using a photolithography, and a fabricating method thereof.

DESCRIPTION OF THE RELATED ART

Generally, a liquid crystal display LCD device has a liquid crystal display panel in which the liquid crystal cells are arranged in a matrix and drive circuits to drive the liquid crystal display panel. The liquid crystal display LCD device controls the light transmissivity of the liquid crystal cells in accordance with a video signal, thereby displaying a picture corresponding to the video signal in the liquid crystal display panel.

The liquid crystal display device is roughly classified into a twisted nematic TN mode where a vertical direction electric field is used, and an in-plane switch IPS mode where a horizontal direction electric field is used, in accordance with the electric field direction in which liquid crystal is driven.

In the TN mode, the liquid crystal is driven by a vertical electric field between a pixel electrode and a common electrode which are arranged on opposite substrates. The TN mode LCD has a large aperture ratio but a small viewing angle. In the IPS mode, the liquid crystal is driven by a horizontal electric field between the pixel electrode and the common electrode which are arranged in parallel on one substrate. The IPS mode LCD has a large viewing angle a small aperture ratio.

FIG. 1 is a sectional diagram representing a liquid crystal display panel of IPS mode of the prior art.

Referring to FIG. 1, the liquid crystal display panel of IPS mode includes an upper array substrate (or a color filter array substrate) having a black matrix 4, a color filter 6, an overcoat layer 7, a spacer 13 and an upper alignment film 8 which are sequentially formed on an upper substrate 2 where a transparent electrode layer 3 is formed on the rear surface for preventing static electricity; a lower array substrate (or a thin film transistor array substrate) having a thin film transistor (hereinafter, referred to as "TFT"), a common electrode 18, a pixel electrode 16 and a lower alignment film 38 which are formed on a lower substrate 32; and a liquid crystal (not shown) injected into an inner space between the upper array substrate and the lower array substrate.

In the upper array substrate, the black matrix 4 is formed to overlap a TFT area of the lower substrate 32 and an area of gate lines and data lines (not shown), and a cell area is provided where a color filter 6 is to be formed. The black matrix 4 prevents light leakage and absorbs external light, thereby increasing contrast. The color filter 6 is formed at the cell area divided by the black matrix 4. The color filter 6 is formed by R, G and B to realize R, G and B colors. The overcoat layer 7 covers the color filter 6 to flatten the upper substrate 2. The column spacer 13 keeps a cell gap between the upper substrate 12 and the lower substrate 32.

In the lower array substrate, the TFT includes a gate electrode 9 formed on the lower substrate 32 along with a gate line (not shown); semiconductor layers 14, 47 overlapping the gate electrode 9 with a gate insulating film 44 therebetween; and source/drain electrodes 40, 42 formed together with a data line (not shown) with the semiconductor layers 14, 47 therebetween. The TFT supplies a pixel signal to a pixel electrode 16 from the data line in response to a scan signal from the gate line.

The pixel electrode 16 is in contact with a drain electrode 42 of the TFT with a protective film 50 therebetween. The protective film 50 is formed from a transparent conductive material with high light transmissivity. The common electrode 18 is formed in a stripe shape and alternates with the pixel electrode 16. The common electrode 18 supplies a common voltage which becomes its standard when driving liquid crystal. The liquid crystal rotates on the basis of horizontal direction by a horizontal electric field of the common voltage and a pixel voltage supplied to the pixel electrode 16.

Upper/lower alignment films 8, 38 for liquid crystal alignment are formed by performing a rubbing process after spreading an alignment material such as polyimide.

FIGS. 2A to 2F are sectional diagrams representing a fabricating method of an upper array substrate of the prior art step by step.

Firstly, a transparent conductive layer 3 is formed at the rear surface of an upper substrate 2 by a deposition method such as sputtering. Subsequently, after an opaque resin is deposited on the entire surface of the upper substrate 2, it is patterned by photolithography using a first mask and an etching process, thereby forming the black matrix 4 as shown in FIG. 2A. Herein, Chrome Cr can be used as the black matrix 4.

After a red resin is deposited on the upper substrate where the black matrix 4 is formed, the red resin R is patterned by photolithography using a second mask and the etching process, thereby forming a red color filter R as shown in FIG. 2B.

After a green resin is deposited on the upper substrate 2 where the red color filter R is formed, the green resin is patterned by photolithography using a third mask and the etching process, thereby forming a green color filter G as shown in FIG. 2C. After a blue resin is deposited on the upper substrate 2 where the green color filter G is formed, the blue resin is patterned by photolithography using a fourth mask and the etching process, thereby forming a blue color filter B as shown in FIG. 2D. Hereby, the red, green, blue color filters 6 are formed.

An organic material is deposited on the entire surface of the upper substrate 2 where the red, green and blue color filters 6 are formed, thereby forming the overcoat layer 7 as shown in FIG. 2E. The overcoat layer 7 prevents disclination caused by a step which is generated by the black matrix 4 formed of the opaque resin.

After a spacer material is deposited on the upper substrate 2 where the overcoat layer 7, the spacer material is patterned by photolithography using a fifth mask and an etching process, thereby forming a column spacer 13 as shown in FIG. 2F.

In this way, in order to form the upper array substrate of the liquid crystal display panel of the prior art, at least 5 mask processes are required. Each of the mask processes includes photolithography which is a series of photolithographic processes that includes spreading photoresist, mask alignment, exposure and development. Each series of photolithographic processes use a substantial amount of time, photoresist, and developing solution that develops the photoresist pattern, as well as using expensive equipment such as exposure equipment. As a result, the fabrication process is complicated and the fabrication cost of the liquid crystal display panel is increased.

SUMMARY OF THE INVENTION

A liquid crystal display panel and fabrication method are provided that is adaptive for patterning an overcoat layer and a spacer of the liquid crystal display panel without using photolithography, thereby simplifying the fabrication process and reducing its cost.

By way of introduction only, a display panel according to an aspect of the present invention comprises a black matrix formed on a substrate; a color filter formed at an area which is divided by the black matrix; and an overcoat layer and a spacer integrally formed on the color filter.

A method of fabricating a display panel according to another aspect of the present invention comprises: forming a black matrix on a substrate; forming a color filter at an area which is divided by the black matrix; and molding a molding layer to form at least one of an overcoat layer or a spacer on the color filter.

A method of fabricating a display panel according to another aspect of the present invention comprises: forming a black matrix on a substrate; forming a color filter at an area which is divided by the black matrix; and integrally forming an overcoat layer and a spacer on the color filter from a liquid pre-polymer.

A soft mold according to another aspect of the present invention comprises a plurality of grooves and a plurality of projected parts. An area of the mold is substantially the same size as a liquid crystal display panel and the grooves are substantially the same size as spacers between opposing substrates in the liquid crystal display panel.

BRIEF DESCRIPTION OF THE DRAWINGS

The invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 3 to 5.

Figure 1:
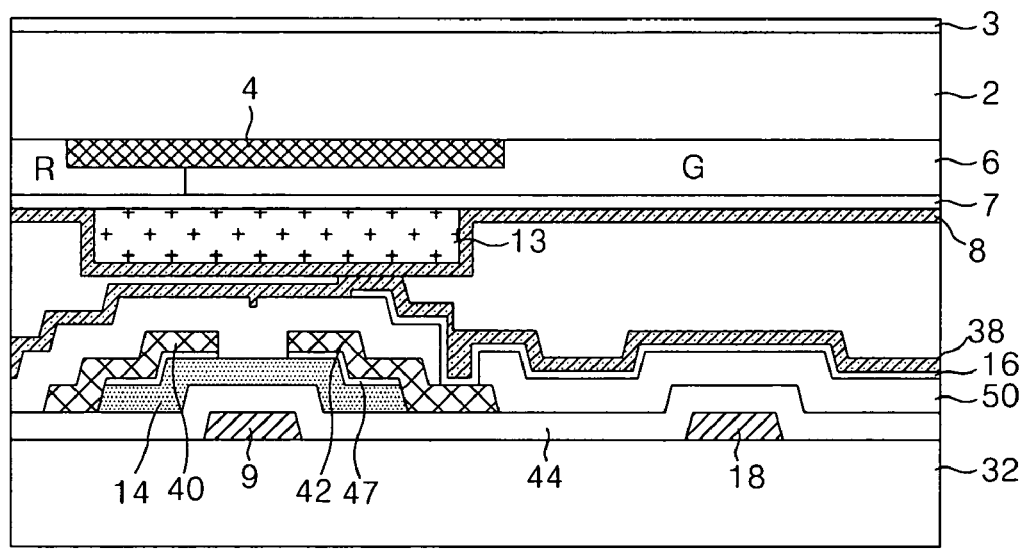
FIG. 1 is a sectional diagram representing a liquid crystal display panel of the prior art.
Figure 2A:
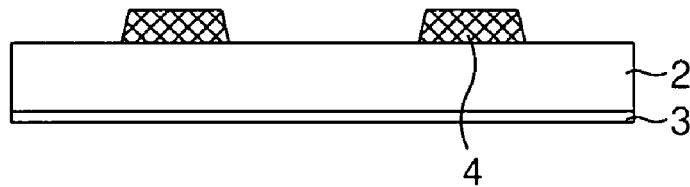
FIGS. 2A to 2F are sectional diagrams representing a step by step fabricating method of an upper array substrate of a liquid crystal display panel of IPS mode of the prior art.
Figure 2B:
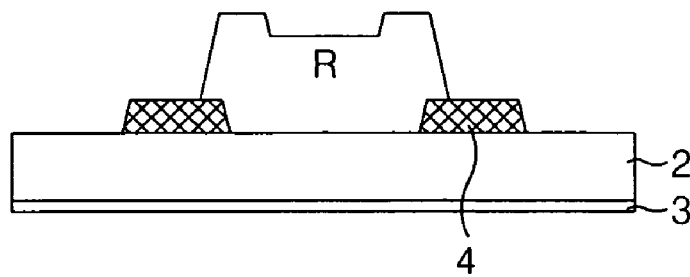
Figure 2C:
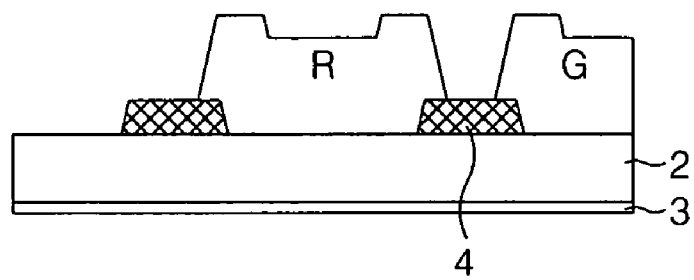
Figure 2D:
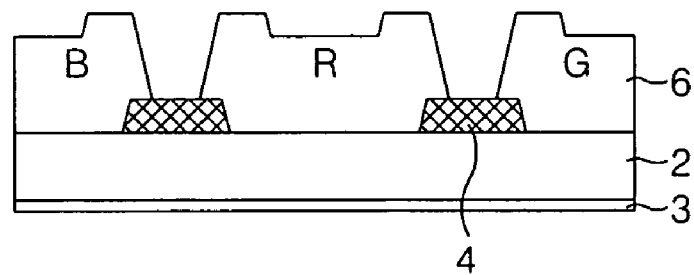
Figure 2E:
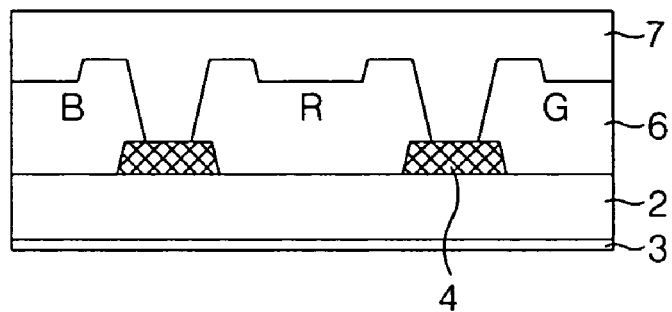
Figure 2F:
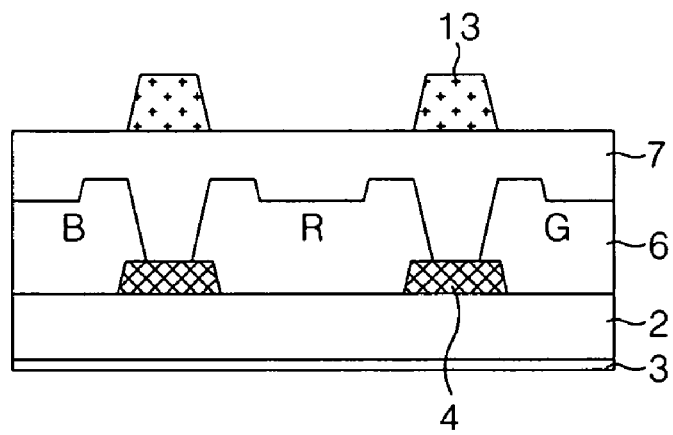
Figure 3:
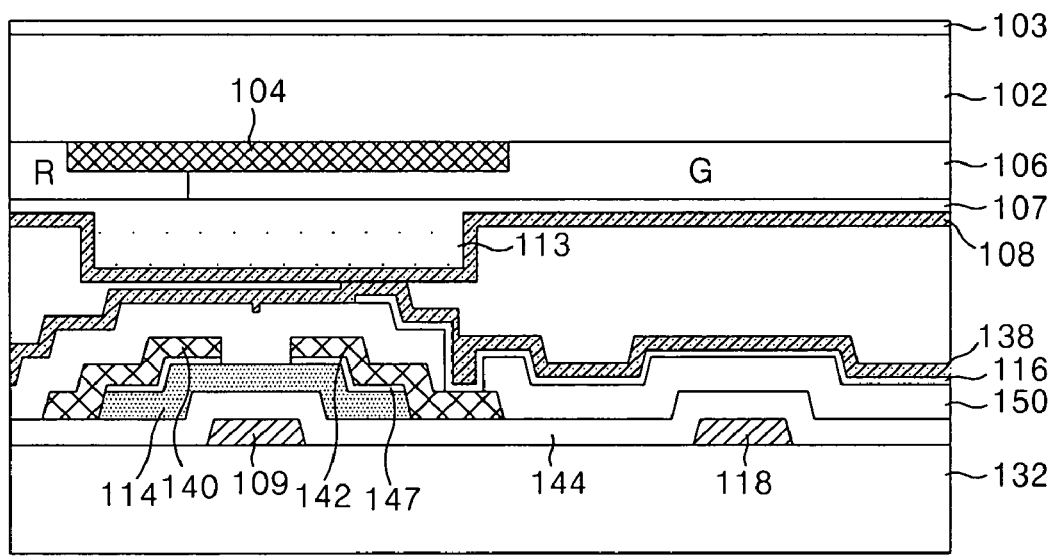
FIG. 3 is a sectional diagram representing a liquid crystal display panel according to an embodiment of the present invention.

FIG. 3 is a sectional diagram representing a liquid crystal display panel of IPS mode according to the present invention.

Referring to FIG. 3, the liquid crystal display panel of IPS mode includes an upper array substrate (or a color filter array substrate) having a black matrix 104, a color filter 106, an overcoat layer 107, a spacer 113 and an upper alignment film 108 which are sequentially formed on an upper substrate 102 where a transparent electrode layer 103 is provided on the rear surface for preventing static electricity; a lower array substrate (or a thin film transistor array substrate) having a thin film transistor (hereinafter, referred to as "TFT"), a common electrode 118, a pixel electrode 116 and a lower alignment film 138 which are formed on a lower substrate 132; and a liquid crystal (not shown) injected into an inner space between the upper array substrate and the lower array substrate.

In the upper array substrate, the black matrix 104 is formed to overlap a TFT area of the lower substrate 132 and an area of gate lines and data lines (not shown), and a cell area is provided where a color filter 106 is to be formed. The black matrix 104 prevents light leakage and absorbs external light, thereby increasing contrast. The color filter 106 is formed at the cell area divided by the black matrix 104. The color filter 106 is formed by R, G and B to realize various colors when driving liquid crystal.

The overcoat layer 107 is formed to cover the color filter 106 to flatten the upper substrate 102. The column spacer 113 keeps the cell gap between the upper substrate 102 and the lower substrate 132.

The overcoat layer 107 and the column spacer 113 are simultaneously formed by a press forming method in the use of a soft mold (not shown). Herein, a liquid pre-polymer is used as the overcoat layer 107 and column spacer 113 material. The liquid pre-polymer can be hardened by heat or light.

The liquid pre-polymer has a composition and composition ratio as shown in Table 1.

TABLE 1

| Composition | Basic Resin (organic matter) | Binder | Photoinitiator |
|---|---|---|---|
| Composition Ratio (%) | 20 ~ 40 | 50 ~ 80 | 1 ~ 10% |

The basic resin contains poly ethylene glycol PEG. The basic resin is a material in which a repulsive force may be generated when in contact with the soft mold. The poly ethylene glycol PEG has a coloration APHA below 20, thus it has good transparency. Accordingly, even though it is used as an overcoat layer material, the transmissivity does not deteriorate in comparison with the prior art.

Styrene-acrylic co-monomer is used as the binder. The styrene-acrylic co-monomer is made by adding styrene co-monomer with excellent adherence to acrylic monomer.

In this way, the liquid pre-polymer is press-formed with the soft mold, thereby forming the spacer and the overcoat layer at the same time. Accordingly, in comparison with the prior art, the fabricating process is simplified and the fabricating cost is reduced.

In the lower array substrate, the TFT includes a gate electrode 109 formed on the lower substrate 132 along with a gate line (not shown); semiconductor layers 114, 147 overlapping the gate electrode 109 with a gate insulating film 144 therebetween; and source/drain electrodes 140, 142 formed together with a data line (not shown) with the semiconductor layers 114, 147 therebetween. The TFT supplies a pixel signal to a pixel electrode 116 from the data line in response to a scan signal from the gate line.

The pixel electrode 116 is in contact with a drain electrode 142 of the TFT with a protective film 150 therebetween. The protective film is formed from a transparent conductive material with high light transmissivity. The common electrode 118 is formed in a stripe shape and alternates with the pixel electrode 116. The common electrode 118 supplies a common voltage which becomes its standard when driving liquid crystal. The liquid crystal rotates on the basis of horizontal direction by a horizontal electric field of the common voltage and a pixel voltage supplied to the pixel electrode 116.

The upper/lower alignment film 108, 138 for aligning liquid crystal are formed by performing a rubbing process after spreading an alignment material such as polyimide.

FIGS. 4A to 4E are sectional diagrams representing a fabricating method of the upper array substrate of the liquid crystal display panel of FIG. 3.

Figure 4A:
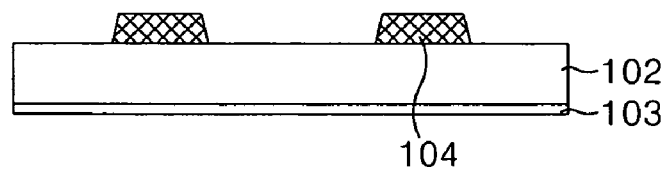
FIGS. 4A to 4E are diagrams representing a fabricating method of an upper array substrate of the liquid crystal display panel shown in FIG. 3.

Firstly, a transparent conductive layer 103 is formed on the rear surface of the upper substrate 102 by a deposition method such as sputtering. Subsequently, after an opaque resin is spread over the entire surface of the upper substrate 102, it is patterned by a photolithography process using a first mask and an etching process, thereby forming the black matrix 104 as shown in FIG. 4A. Herein, Chrome Cr can be used as a black matrix 104 material.

Figure 4B:
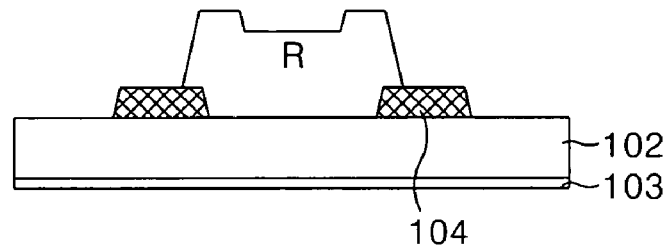

After a red resin is deposited on the upper substrate 102 where the black matrix 104 is formed, the red resin R is patterned by the photolithography process using a second mask and the etching process, thereby forming a red color filter R as shown in FIG. 4B.

Figure 4C:
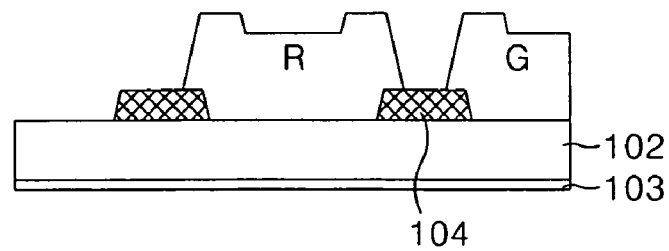
Figure 4D:
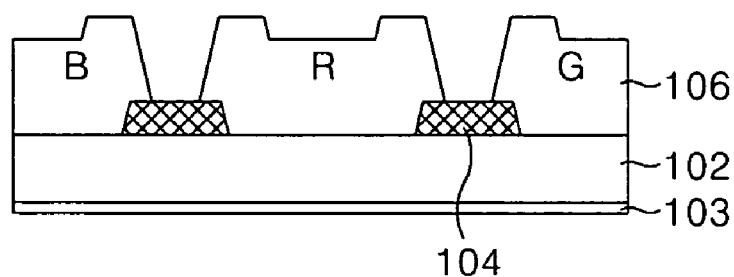

After a green resin is deposited on the upper substrate 102 where the red color filter R is formed, the green resin is patterned by the photolithography process using a third mask and the etching process, thereby forming a green color filter G as shown in FIG. 4C. After a blue resin is deposited on the upper substrate 102 where the green color filter G is formed, the blue resin is patterned by the photolithography process using a fourth mask and the etching process, thereby forming a blue color filter B as shown in FIG. 4D. Hereby, the red, green, blue color filters 106 are formed.

Figure 4E:
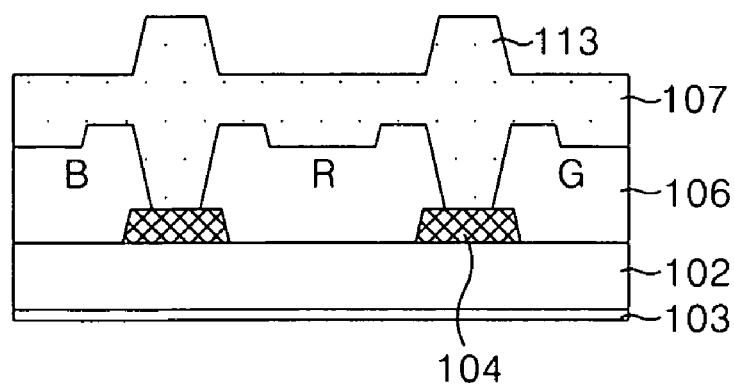

After forming a liquid pre-polymer material on the upper substrate 102 where the red, green and blue color filters 106 are formed, it is press-formed with the soft mold having a groove for forming a spacer, thereby forming the overcoat layer 107 and the spacer 113 at the same time as shown in FIG. 4E.

This will be described in detail referring to FIGS. 5A to 5C, as follows.

Figure 5A:
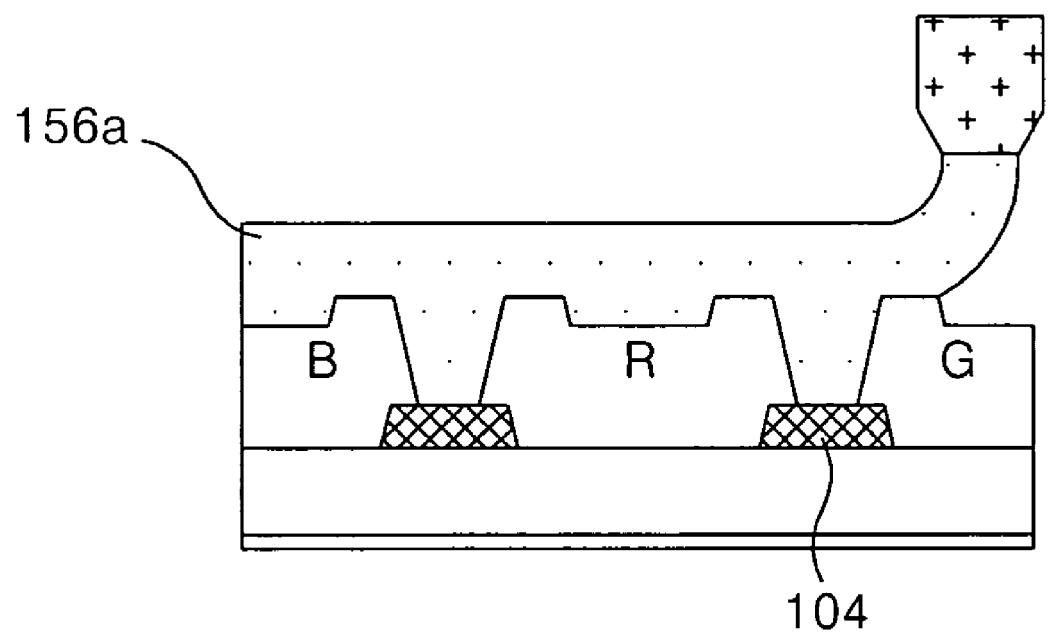
FIGS. 5A to 5C are diagrams representing that a spacer and an over coat layer are formed by use of a soft mold.

The liquid pre-polymer material 156a is spread on the upper substrate 102, where the color filter 106 is formed, by a deposition method such as nozzle or spin coating, as shown in FIG. 5A.

The liquid pre-polymer material 156a has the composition and composition ratio as shown in Table 1.

As indicated above, the basic resin contains poly ethylene glycol PEG and a repulsive force may be generated when the basic resin is in contact with the soft mold 134. Styrene-acrylic co-monomer is used as the binder. The styrene-acrylic co-monomer is made by adding styrene co-monomer with excellent adherence to acrylic monomer. Herein, the liquid pre-polymer is spread to have a designated thickness in consideration of the height of the overcoat layer 107 and the spacer 113. For example, if the spacer has a height of about 4 μm and the overcoat layer has height of about 2 μm, the liquid pre-polymer 156a is spread to have about 6 μm in thickness.

Figure 5B:
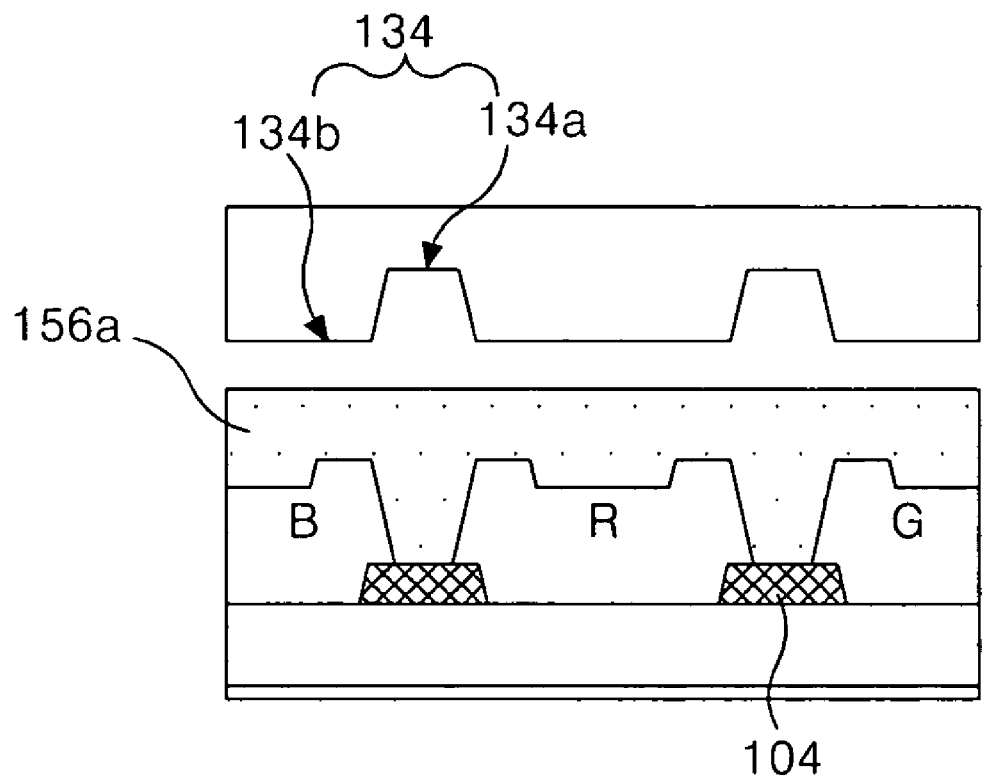
Figure 5C:
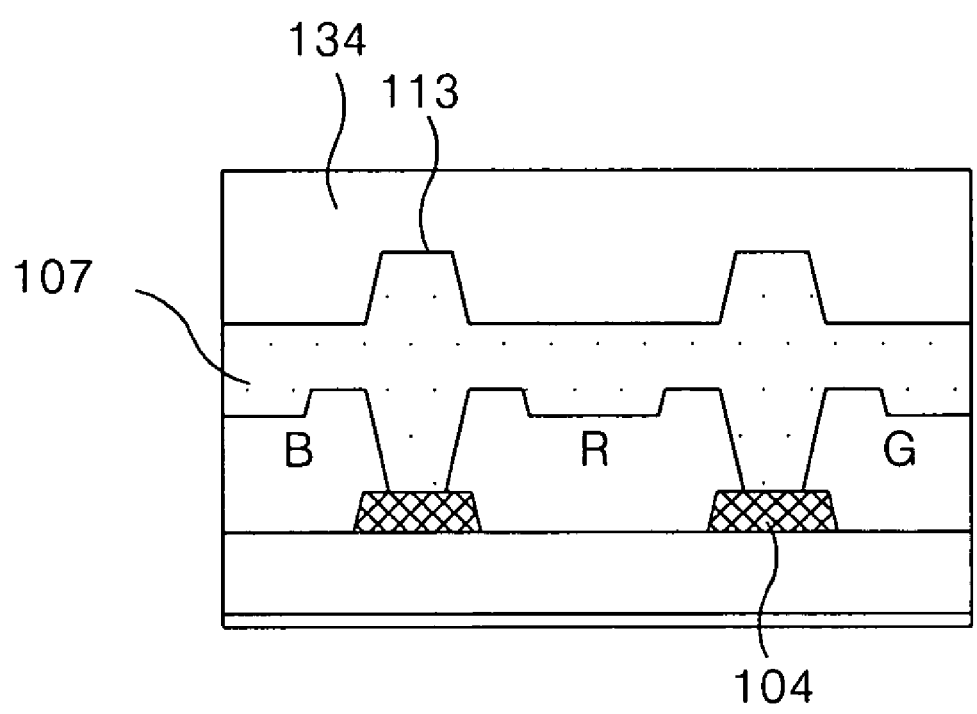

The soft mold 134 having the groove 134a and the projected part 134b, as shown in FIG. 5B, is aligned to the liquid pre-polymer material 156a. The groove 134a of the soft mold 134 corresponds to an area where the spacer 113 is formed. The soft mold 134 is formed of a rubber material, which has high elasticity, such as poly dimethylsiloxane PDMS, polyurethane and cross-linked novolacresin.

The soft mold 134 is pressed to the liquid pre-polymer material 156a with a weight of about its own weight for a designated time, e.g., about 10 minutes to 2 hours, so as for it to be in contact with the surface of the projected part 134b of the soft mold, the color filter 106 and the black matrix 104. The upper substrate 102 is baked at a temperature of about 130° C. or below. Part of the liquid pre-polymer material 156a moves into the groove 134a of the soft mold 134 by capillary action, which is generated by the pressure between the soft mold 134 and the substrate 102, and a repulsive force between the soft mold 134 and the liquid pre-polymer material 156a. Accordingly, the overcoat layer 107 and the spacer 113 are formed with the inverse pattern of the soft mold 134 as shown in FIG. 5C.

That is, the liquid pre-polymer material is spread in a sufficient thickness, thereby forming the spacer 113 from the liquid pre-polymer material 156a which moves into the groove 134a of the soft mold 134 and the overcoat layer 107 from the liquid pre-polymer material 156a which does not move into the groove 134a of the soft mold 134.

After then, an alignment film is formed on the overcoat layer 107 and the spacer 113.

On the other hand, a common electrode can be formed on the overcoat layer 107 and the spacer 113. This permits the common electrode to form a vertical electric field with the pixel electrode, which is located in the upper array substrate.

In this way, the liquid crystal display panel and the fabricating method thereof according to the present invention forms the liquid pre-polymer material on the substrate where the color filter is formed, and then the liquid pre-polymer material is press-formed with the soft mold to form the spacer and the overcoat layer. Hereby, exposure and development processes are omitted, and expensive equipment such as exposure equipment is not required, thereby simplifying its fabricating process and reducing its cost.

The method of forming the spacer and the overcoat layer with the soft mold without using multiple photolithographic processes can be applied not only to the liquid crystal display panel of IPS mode and the liquid crystal display panel of TN mode, but also to the liquid crystal display panel of electrical controlled birefringence ECB and vertical alignment VA mode.

As described above, the liquid crystal display panel and the fabricating method thereof according to the present invention forms the spacer and the overcoat layer by press-forming the liquid pre-polymer material with the soft mold, thus exposure and development processes are not required and expensive equipment such as exposure equipment is not required. Accordingly, its fabricating process becomes simplified and its cost is reduced.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A display panel comprising:
   a black matrix formed on a substrate;
   a color filter formed at an area which is divided by the black matrix; and
   an overcoat layer and a spacer integrally formed on the color filter by a self-weight of a soft mold, the overcoat layer and the spacer comprising a polymerized liquid pre-polymer, wherein the polymerized liquid pre-polymer comprises about 20~40% organic matter, about 50~80% binder and about 1~10% photoinitiator.

2. The display panel according to claim 1, wherein the organic matter comprises poly ethylene glycol and the binder comprises styrene-acrylic co-monomer.

3. The display panel according to claim 1, further comprising a common electrode formed on the spacer and the overcoat layer.

4. A method of fabricating a display panel, the method comprising:
   forming a black matrix on a substrate;
   forming a color filter at an area which is divided by the black matrix; and
   molding a molding layer to form at least one of an overcoat layer or a spacer on the color filter by a self-weight of a soft mold, wherein the molding layer comprises a liquid pre-polymer that contains about 20~40% organic matter, about 50~80% binder and about 1~10% photoinitiator.

5. The method according to claim 4, further comprising molding the molding layer to form the overcoat layer and spacer.

6. The method according to claim 4, wherein the molding comprises disposing a mold on the molding layer for a predetermined time and heating the substrate at a predetermined temperature.

7. The fabricating method according to claim 4, wherein the organic matter includes poly ethylene glycol and the binder includes styrene-acrylic co-monomer.

8. The fabricating method according to claim 4, further comprising forming a common electrode on the spacer and the overcoat layer.

9. The method according to claim 4, wherein the molding comprises permitting a mold to press the molding layer without applying external pressure to the mold.

10. The method according to claim 4, wherein formation of the spacer occurs without planarization of the overcoat layer.

11. The method according to claim 4, wherein the molding comprises:
    spreading the molding layer on the color filter; and
    forming the spacer and the overcoat layer by placing a mold on the molding layer, the spacer corresponding to a groove of the mold and the overcoat layer corresponding to an area of the mold other than the groove.

12. A method of fabricating a display panel, the method comprising:
    forming a black matrix on a substrate;
    forming a color filter at an area which is divided by the black matrix; and
    integrally forming an overcoat layer and a spacer on the color filter from a liquid pre-polymer by a self-weight a soft mold, wherein the liquid pre-polymer contains about 20~40% organic matter, about 50~80% binder and about 1~10% photoinitiator.

13. The fabricating method according to claim 12, wherein the organic matter includes poly ethylene glycol and the binder includes styrene-acrylic co-monomer.

14. The method according to claim 12, wherein the formation of the overcoat layer and spacer comprises inducing the liquid pre-polymer to take the shape of the overcoat layer and spacer for a predetermined time and heating the substrate at a predetermined temperature.

15. The fabricating method according to claim 12, further comprising forming a common electrode on the spacer and the overcoat layer.

* * * * *